Jan. 27, 1959   S. S. FOUSE ET AL   2,871,285
BRANCH BUS DUCT STRUCTURES
Filed Sept. 4, 1953   2 Sheets-Sheet 1
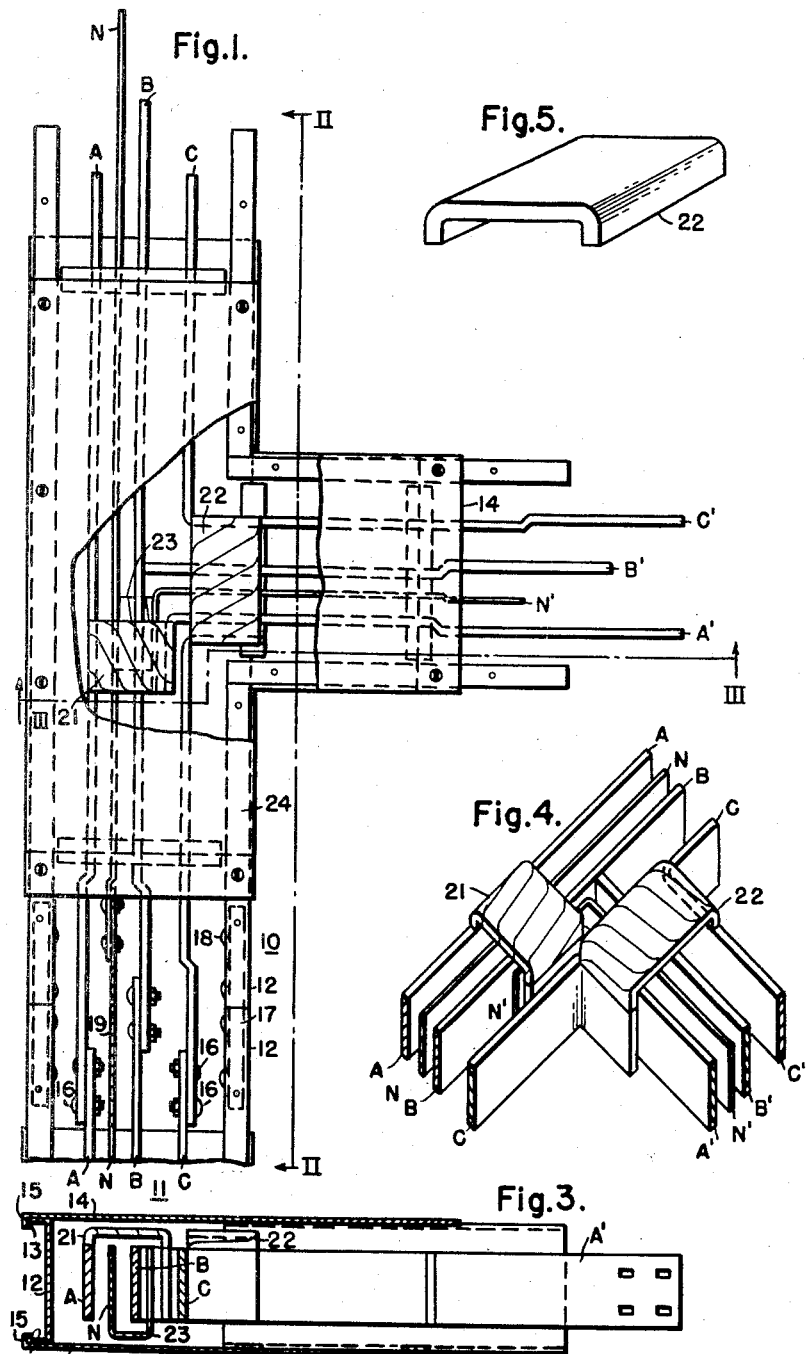
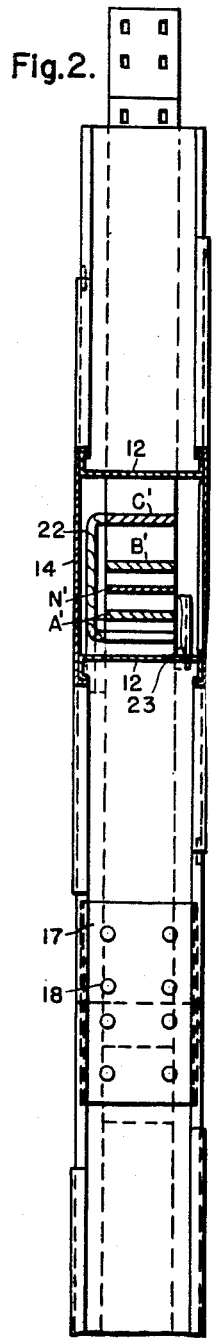
WITNESSES:
INVENTORS
Samuel S. Fouse
and Earl O. Krance.
BY 
ATTORNEY Jan. 27, 1959 S. S. FOUSE ET AL 2,871,285
BRANCH BUS DUCT STRUCTURES
Filed Sept. 4, 1953 2 Sheets-Sheet 2
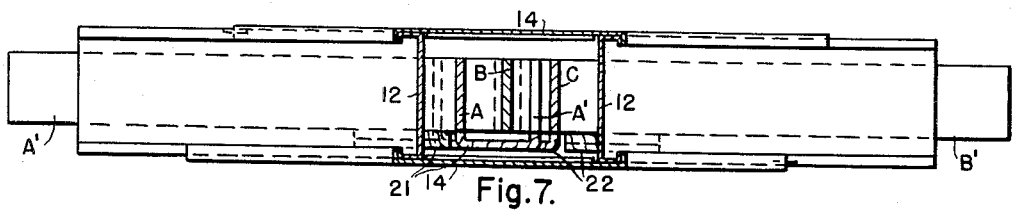
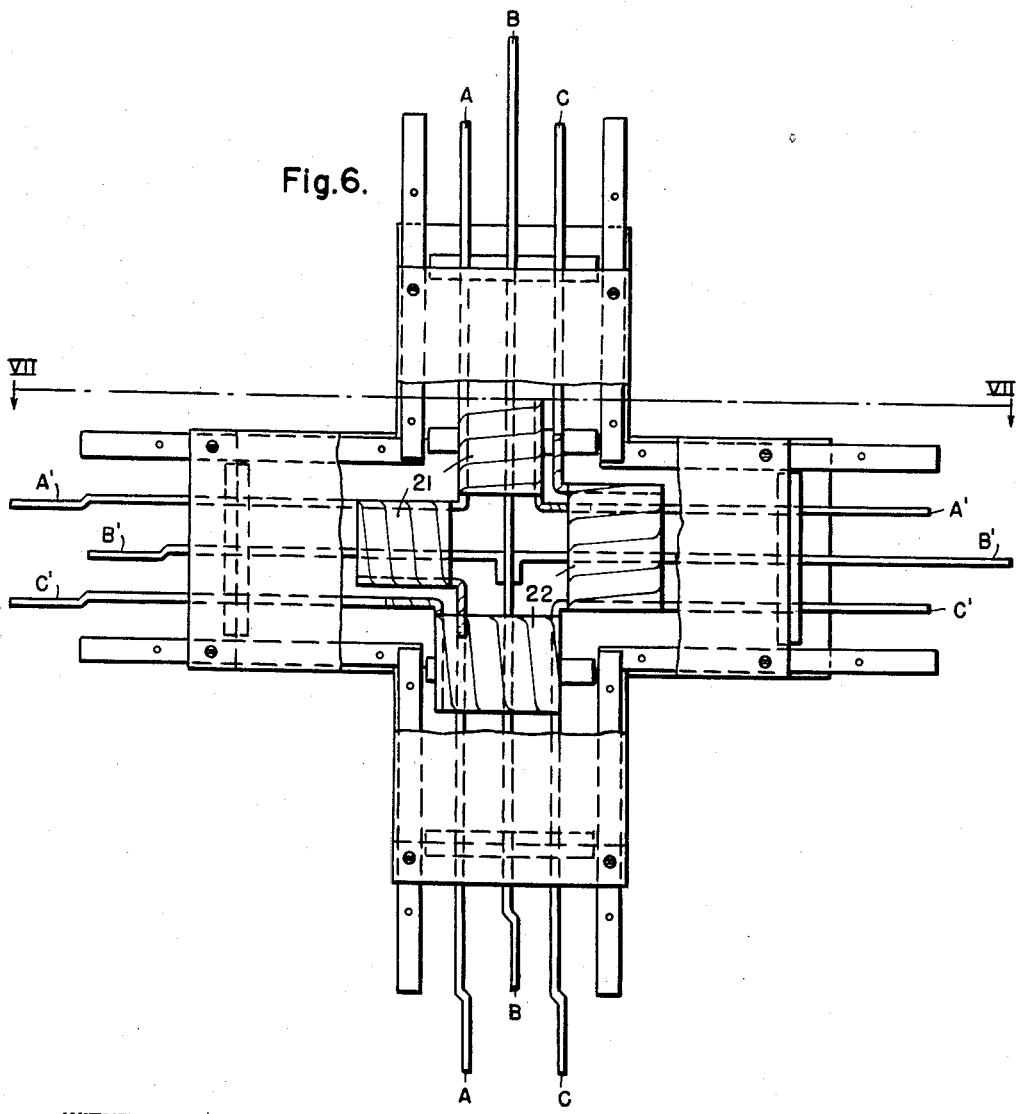
WITNESSES:
E. A. McCloskey
Wm. B. Sellers.
INVENTORS
Samuel S. Fouse
and Earl O. Krance.
BY
ATTORNEY United States Patent Office 2,871,285
Patented Jan. 27, 1959

2,871,285

BRANCH BUS DUCT STRUCTURES

Samuel S. Fouse, Aliquippa, and Earl O. Krance, Beaver, Pa., assignors to Westinghouse Electric Corporation, East Pittsburgh, Pa., a corporation of Pennsylvania Application September 4, 1953, Serial No. 378,568

12 Claims. (Cl. 174—72)

Our invention relates, generally, to bus duct for electrical distribution systems and, more particularly, to angle connections for bus duct of the plug-in type.

When installing bus duct it is frequently necessary to utilize angle connections, such as T connections and crossovers, in order to provide a satisfactory layout of the bus duct. The angle connections available heretofore have been somewhat complicated in structure and large in size.

An object of our invention, generally stated, is to provide a simplified and improved angle connection for bus duct.

A more specific object of our invention is to provide connectors or tie bars which may be utilized for making either T connections or crossovers for bus duct.

Another object of our invention is to provide an angle connection for bus duct having a housing which has the same cross-sectional area at the connection as the cross-sectional area of the housing of the main run of the bus duct.

A further object of our invention is to reduce the amount of copper required for making an angle connection for bus duct.

Other objects of our invention will be explained fully hereinafter or will be apparent to those skilled in the art.

In accordance with one embodiment of our invention, an angle connection, such as a T or a crossover for the phase conductors of bus duct is made by utilizing U-shaped connectors or tie bars which are brazed to the edges of the bus bars. The center main bus bar in a three-phase system extends straight through the connection and the end of the center bar for the branch conductors is brazed to the straight bar. The outer bars for the branch conductors are connected to the outer bars for the main conductors through U-shaped tie bars which may be utilized for either a T connection or a crossover. The housing for the angle connection is similar to the duct housing and has the same cross-sectional area as the main duct housing, with no enlargement to accommodate the connections.

For a better understanding of the nature and objects of the invention, reference may be had to the following detailed description, taken in conjunction with the accompanying drawing, in which:

Figure 1 is a view, in side elevation, of part of a bus duct structure embodying the principal features of the invention, portions being broken away for clearness;

Fig. 2 is a view, in section, taken along the line II—II in Fig. 1;

Fig. 3 is a view, in section, taken along the line III—III in Fig. 1;

Fig. 4 is a view, in perspective, of a portion of a T connection for the bus duct;

Fig. 5 is a view, in perspective, of one of the tie bars for the T connection;

Fig. 6 is a view, in side elevation, of a crossover similar to the T connection shown in Fig. 1; and Fig. 7 is a view, in section, taken along the line VII—VII in Fig. 6.

Referring to the drawings, and particularly to Figs. 1 to 5, the bus duct structure shown therein comprises a housing 10 inside of which is disposed a set of three-phase bus bars 11 which may be supported in the usual manner by insulating blocks (not shown). The three phases are designated A, B, C. A neutral bar N may be disposed between two of the phase bars as shown.

As shown most clearly in Figs. 2 and 3, the duct housing 10 comprises generally channel-shaped members 12 having inturned flanges 13, and side plates 14 having flanges 15 which overlap the flanges 13 on the channels 12. In accordance with the usual practice the bus duct may be manufactured in sections of predetermined lengths and the sections joined together at their ends.

As shown in Fig. 1, the bus bars for each phase overlap each other at a joint between two sections and they may be connected by bolts 16. The ends of the channel members 12 of two adjoining sections abut against each other and they are joined together by splice plates 17 which are held in place by bolts 18. In view of the close clearance between the neutral bar N and the bolts which join the adjacent phase bars, the bar N is covered with insulating tape 19 over the portion which is adjacent to the bolts 16.

When installing bus duct it is frequently necessary to provide T and crossover connections in the structure. Heretofore the angle connections, such as T and crossover connections, have been somewhat complicated in structure and required a relatively large amount of space.

In order to simplify the structure and reduce its size we devised the angle connections herein described. The T connections for the three-phase conductors A, B and C and the neutral conductor N are shown in Fig. 4. As shown in this figure, the main bus bar for phase B is intermediate the outer bus bars A and C, and extends straight through the connection. The intermediate branch bus bar designated B' is disposed at right angles to the bar for phase B with the end edge of the bar B' abutting the side of the bar B. The end edge of the bar B may be brazed to the side of the bar B, thereby providing a secure connection between the two main bars. The bus bar for phase A also extends through the T connection. The branch bar A' for phase A has a right angle bend at its one end which is connected to the bar A by means of a generally U-shaped tie bar 21 bridging over the intermediate main bus bar B and the intermediate neutral bar N. The end edges of the legs of the tie bar 21 may be brazed to the edges of the bars A and A'.

The main bus bar C is divided into two sections each of which has a right angle bend therein. These two sections are connected together by a generally U-shaped tie bar 22 extending at right angles to the tie bar 21 and bridging the branch bars A', N' and B'. The end edge of one leg of the tie bar 22 is brazed to the angularly bent portion of one section of the bar C and its other leg is similarly brazed to the angularly bent portion of the other section of the bar C which becomes the branch bar C' as designated in the drawing.

The main neutral bar N extends straight through the T connection and it is connected to the branch neutral bar N' by a tie bar 23 as shown most clearly in Fig. 3. The one end of the branch neutral bar N' which is connected to the neutral bar N by the connector 23 is bent at right angles as shown most clearly in Fig. 4. As also shown in Figs. 1, 3 and 4, tie bars 21, 22 and 23 are taped with an insulating tape to prevent flash-over between the tie bars and the housing or the bus bars which they span when secured in place.

In this manner the branch bus bars are in alignment with the main bus bars. The T connections are made by utilizing bars having simple right angle bends therein and relatively simple U-shaped tie bars having legs which are brazed to the edges of the bus bars. A relatively small amount of brazing is required to make the connections and considerable copper is saved since there is no overlapping between the tie bars and the bus bars, as where a bolted or riveted connection is made.

It will be seen that the cross-sectional area of the housing of the T connection is substantially the same as the cross-sectional area of the housing of the main run of the bus duct. Thus, considerable space is saved and the unsightly appearance and cost of the relatively large box required for previous T connections is eliminated.

As shown in Fig. 2 the housing for the T connection comprises channel members 12 and side plates 14 which are similar to the members for duct housing. A removable cover plate 24 is provided for the T connection, thereby providing access to the tie bars and other members constituting the T connection.

The right angle crossover shown in Figs. 6 and 7 is similar in structure to the right angle T connection shown in Figs. 1 to 4. The tie bars 21 and 22 which are utilized for connecting the branch bus bars to the main bus bars are the same as the ones utilized in the T connection, thereby reducing the number of parts required for making connections of both types.

It will be noted that the main bus bar for phase B is intermediate the outer bars A and C, and extends straight through the connection. The ends of the intermediate branch bus bar B' abut the sides of the intermediate bus bar B and are brazed to the bus bar B. As shown, a short right angle bend may be provided at the ends of the bar B' which are secured to the bar B.

In the present structure the outer phase bars A and C are both divided into two sections, one of which is bent at right angles and continues as the corresponding phase bar A' or C'. The other section of the bar for phase A has a right angle bend at its end which is connected to the bar A' by a tie bar 21. Likewise, the other section of bar C has a right angle bend therein which is connected to the bar C' by a tie bar 22.

In a similar manner left hand bar C' has a right angle bend therein which is connected to the main bar C by a tie bar 22. Likewise, the right hand bar A' has a right angle bend therein which is connected to the main bar A by a tie bar 21.

As shown in Fig. 7, the housing for the crossover connection comprises channel members 12 and side plates 14. The cross-sectional area of the housing for the crossover connections is substantially the same as the cross-sectional area for the duct as previously explained in the description of the T connection. Thus the amount of space required for the crossover section is reduced and the appearance of the connection is improved and the cost is reduced by eliminating the bulky and unsightly box required to enclose previous connections.

As previously explained, the same tie bars may be utilized for either T connections or crossover connections, thereby reducing the number of parts required for making these connections. Also, since the members for the housing for the T and crossover connections are of the same shape as the members for the duct housing, the same tools may be used for forming these members as are used for forming the members of the duct housing.

From the foregoing description it is apparent that we have provided right angle connections, such as T and crossover connections, for bus duct which are relatively simple in structure and which may be installed in housings having the same cross-sectional area as the main duct housing. Furthermore, the amount of copper required for making the angle connections is reduced since there is no overlapping of the connection members. Also, the number of operations required to assemble the members is reduced. Accordingly, the cost of manufacturing and assembling the angle connections is reduced.

Although we have described only two specific embodiments of the invention, it is to be clearly understood that other changes and modifications can readily be made without departing from the spirit and scope of this invention.

We claim as our invention:

1. In a multi-phase bus duct, in combination, a duct housing, at least three substantially flat main bus bars of different phases disposed in the housing with their longitudinal center lines lying in the same plane, at least three substantially flat branch bus bars disposed substantially at right angles to the main bus bars with their longitudinal center lines lying in the same plane as the longitudinal center lines of the main bus bars, at least one branch bus bar abutting a side of at least one main bus bar of the corresponding phase, and a generally U-shaped tie bar connecting each one of the other branch bus bars to one of the other main bus bars of the corresponding phase, the legs of said tie bars being secured to the edges of the bus bars.

2. In a multi-phase bus duct, in combination, a generally rectangular housing, at least one substantially flat main bus bar of one phase extending straight through the housing, other substantially flat main bus bars of other phases disposed parallel to said one main bus bar with their longitudinal center lines lying in the same plane, substantially flat branch bus bars disposed substantially at right angles to the main bus bars with their longitudinal center lines lying in the same plane as the longitudinal center lines of the main bus bars, one end edge of one of the branch bus bars being secured directly to a side of said straight main bus bar, and a generally U-shaped tie bar connecting each one of the other branch bus bars to one of the other main bus bars of the corresponding phase, said tie bars having their end edges connected to the edges of bus bars.

3. In a multi-phase bus duct, in combination, a generally rectangular housing, an intermediate main bus bar of one phase extending through the housing, outer main bus bars of other phases disposed parallel to the intermediate bus bar with their longitudinal center lines lying in the same plane, branch bus bars disposed substantially at right angles to the main bus bars with their longitudinal center lines lying in the same plane as the longitudinal center lines of the main bus bars, one end of the intermediate branch bus bar being secured directly to the intermediate main bus bar, a generally U-shaped tie bar connecting each one of the outer branch bus bars to one of the outer main bus bars of the corresponding phase, and a cover plate on said housing providing access to said tie bars, said housing having substantially the same cross-sectional area throughout its length.

4. In a multi-phase bus duct, in combination, a housing, a substantially flat intermediate main bus bar of one phase extending through the housing, substantially flat outer main bus bars of other phases disposed parallel to the intermediate bus bar with their longitudinal center lines lying in the same plane, substantially flat branch bus bars disposed substantially at right angles to the main bus bars with their longitudinal center lines lying in the same plane as the longitudinal center lines of the main bus bars, one end of an intermediate branch bus bar being secured directly to a side of the intermediate main bus bar, and generally U-shaped tie bars connecting edges of the outer branch bus bars to edges of the outer main bus bars of corresponding phases, one tie bar bridging at least one branch bus bar and another tie bar bridging at least one main bus bar.

5. An angle connection for multi-phase bus duct comprising an intermediate main bus bar of one phase extending straight through the connection, outer main bus bars of different phases disposed parallel to the intermediate bus bar, branch bus bars disposed substantially at right angles to the main bus bars, an intermediate branch bus bar being secured directly to the intermediate main bus bar, at least one of the outer main bus bars being divided into two sections, each section having a right angle bend therein, a tie bar connecting said sections which are of the corresponding phase, and an additional tie bar at right angles to aforesaid tie bar and connecting an outer main bus bar to an outer branch bus bar of the corresponding phase, said tie bars having portions lying in a plane perpendicular to the planes of the main bus bars and the branch bus bars.

6. An angle connection for multi-phase bus duct comprising an intermediate main bus bar of one phase extending straight through the connection, outer main bus bars of different phases disposed parallel to the intermediate bus bar, branch bus bars disposed substantially at right angles to the main bus bars, an intermediate branch bus bar being secured directly to the intermediate main bus bar, at least one of the outer main bus bars being divided into two sections, each section having a right angle bend therein, a tie bar connecting said sections which are of the corresponding phase, and an additional tie bar at right angles to aforesaid tie bar and connecting an outer main bus bar to an outer branch bus bar of the corresponding phase, said tie bars being generally of a U shape and having the ends of the legs of the U secured to the edges of the bus bars, the bases of said U-shaped tie bars lying in a plane perpendicular to the planes of the main bus bars and the branch bus bars.

7. An angle connection for multi-phase bus duct comprising an intermediate main bus bar of one phase extending straight through the connection, outer main bus bars of different phases disposed parallel to the intermediate bus bar, branch bus bars disposed substantially at right angles to the main bus bars, an intermediate branch bus bar being secured directly to the intermediate main bus bar, at least one of the outer main bus bars being divided into two sections, each section having a right angle bend therein, a tie bar connecting said sections which are of the corresponding phase, and an additional tie bar at right angles to aforesaid tie bar and connecting an outer main bus bar to an outer branch bus bar of the corresponding phase, said tie bars being generally of a U shape and having the ends of the legs of the U secured to the edges of the bus bars, each of said tie bars spanning at least one bus bar, the bases of said U-shaped tie bars lying in a plane perpendicular to the planes of the main bus bars and the branch bus bars.

8. A T connection for multi-phase bus duct comprising a center main bus bar of one phase extending straight through the connection, two outer main bus bars of different phases disposed on opposite sides of and parallel to the center bus bar, branch bus bars disposed substantially at right angles to the main bus bars, the center branch bus bar being secured directly to the center main bus bar, one of said outer main bus bars extending through the T connection, the other of said outer main bus bars being divided into two sections, each section having a right angle bend therein, a tie bar connecting said sections which are of the corresponding phase, one of said right angle bends extending as one of the outer branch bus bars, the other of said outer branch bus bars having a right angle bend at one end, and an additional tie bar connecting said other outer branch bar to the other outer main bus bar which is of the corresponding phase, said tie bars having portions lying in a plane perpendicular to the planes of the main bus bars and the branch bus bars.

9. A T connection for multi-phase bus duct comprising a center main bus bar of one phase extending straight through the connection, two outer main bus bars of different phases disposed on opposite sides of and parallel to the center bus bar, branch bus bars disposed substantially at right angles to the main bus bars, the center branch bus bar being secured directly to the center main bus bar, one of said outer main bus bars extending through the T connection, the other of said outer main bus bars being divided into two sections, each section having a right angle bend therein, a tie bar connecting said sections which are of the corresponding phase, one of said right angle bends extending as one of the outer branch bus bars, the other of said outer branch bus bars having a right angle bend at one end, and an additional tie bar connecting said other outer branch bar to the other outer main bus bar which is of the corresponding phase, said tie bars being generally of a U shape and having the ends of the legs of the U secured to the edges of the bus bars, the bases of said U-shaped tie bars lying in a plane perpendicular to the planes of the main bus bars and the branch bus bars.

10. A crossover connection for multi-phase bus duct comprising a center main bus bar of one phase extending straight through the connection, two outer main bus bars of different phases disposed on opposite sides of and parallel to the center bus bar, branch bus bars extending in opposite directions from and at substantially right angles to the main bus bars, the center branch bus bars being secured directly to the center main bus bar, each one of said outer main bus bars being divided into two sections, each section having a right angle bend therein, one of said right angle bends in each outer main bus bar extending as one of the outer branch bus bars, each of the other outer branch bus bars having a right angle bend therein, and tie bars connecting said outer main bus bars and said outer branch bus bars of corresponding phases, said tie bars having portions lying in a plane perpendicular to the planes of the main bus bars and the branch bus bars.

11. A crossover connection for multi-phase bus duct comprising a center main bus bar of one phase extending straight through the connection, two outer main bus bars of different phases disposed on opposite sides of and parallel to the center bus bar, branch bus bars extending in opposite directions from and at substantially right angles to the main bus bars, the center branch bus bars being secured directly to the center main bus bar, each one of said outer main bus bars being divided into two sections, each section having a right angle bend therein, one of said right angle bends in each outer main bus bar extending as one of the outer branch bus bars, each of the other outer branch bus bars having a right angle bend therein, and tie bars connecting said outer main bus bars and said outer branch bus bars of corresponding phases, said tie bars being generally of a U shape and having the ends of the legs of the U secured to the edges of the bus bars, the bases of said U-shaped tie bars lying in a plane perpendicular to the planes of the main bus bars and the branch bus bars.

12. In a multi-phase bus duct, in combination, a duct housing, at least three main bus bars of different phases disposed in the housing with their longitudinal center lines lying in the same plane, at least three branch bus bars disposed substantially at right angles to the main bus bars with their longitudinal center lines lying in the same plane as the longitudinal center line of the main bus bars, at least one branch bus bar abutting at least one main bus bar, generally U-shaped tie bars connecting other branch bus bars to other main bus bars of corresponding phases, the ends of the legs of said tie bars being secured to the edges of the bus bars, at least one of said tie bars spanning main bus bars, and at least one other of said tie bars spanning branch bus bars.

References Cited in the file of this patent

UNITED STATES PATENTS

| | | |
|---|---|---|
| 502,083 | McEvoy | July 25, 1893 |
| 1,840,887 | De Mask | Jan. 12, 1932 |
| 2,606,233 | Schymik | Aug. 5, 1952 |
| 2,798,898 | Popovich et al. | July 9, 1957 |
| 2,824,901 | Reichert et al. | Feb. 25, 1958 |